W. S. MARSH.
HORSE PROTECTORS.

No. 189,369. Patented April 10, 1877.

Witnesses
Herbert G. Briggs
Edgar B. Brown

Inventor
Wm. S. Marsh
Per
Wm. Henry Clifford
Atty

UNITED STATES PATENT OFFICE.

WILLIAM S. MARSH, OF NEW GLOUCESTER, MAINE.

IMPROVEMENT IN HORSE-PROTECTORS.

Specification forming part of Letters Patent No. 189,369, dated April 10, 1877; application filed January 23, 1877.

*To all whom it may concern:*

Be it known that I, WILLIAM S. MARSH, of New Gloucester, in the county of Cumberland and State of Maine, have invented certain new and useful Improvements in Horse-Protectors; and I do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1:
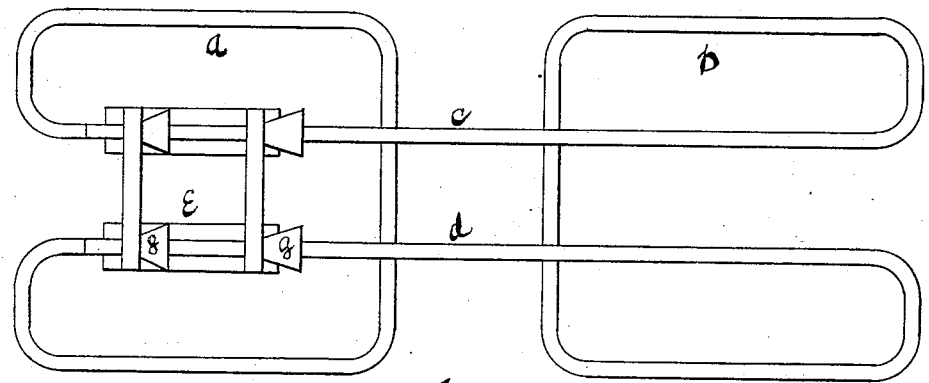
Figure 2:
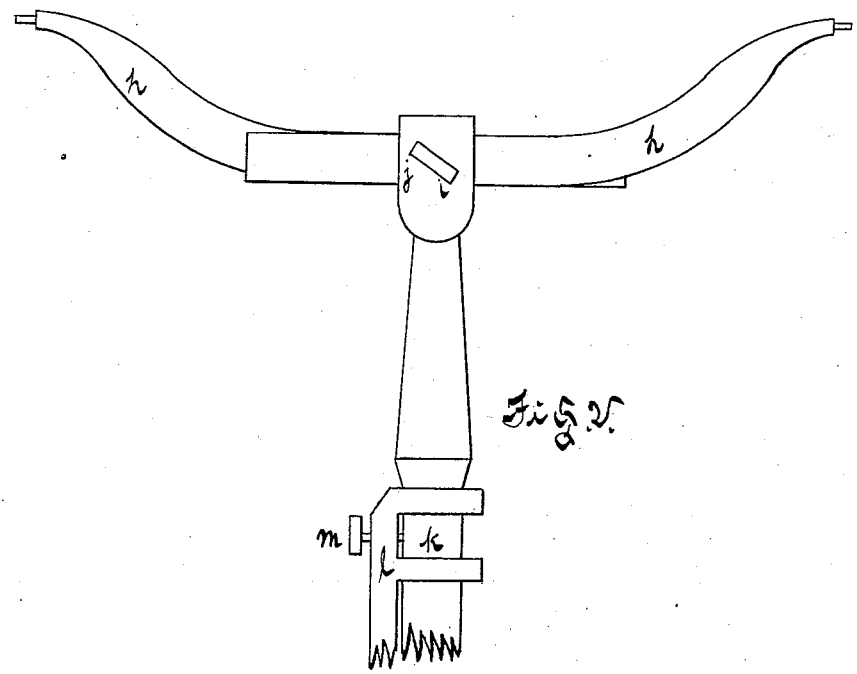
Figure 3:
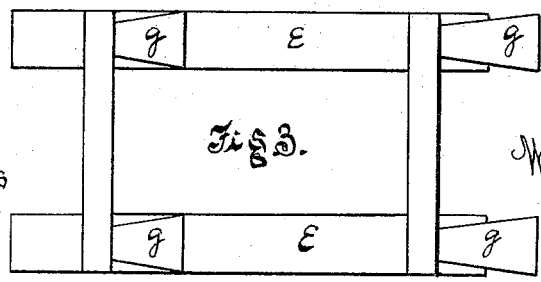

Figure 1 is a plan of the frame; Fig. 2, device used to hold the protector over a span; Fig. 3, sliding socket.

The object of my invention is to produce an improved protection to horses, while harnessed to vehicles, from rain, heat, &c.

Letters Patent of the United States were granted to me June 20, 1876, and numbered 178,867; but I do not claim anything covered by said patent.

My present improvement may be thus described: It consists of the two parts $a$ and $b$. The part $b$ is made as shown in the drawings, and has the two projecting arms or rods $c\ d$. The part $a$ has the form of frame, as shown, and the metal frame $e$, attached to the rods $f$ of the part $a$. This frame $e$ carries the sockets $g$, to receive the arms $c\ d$. These arms, moving in the sockets, permit the frame to be shortened or lengthened, as desired. The part $a$ is to be supported over the forward part of the body of the horse. It is slightly elevated above the part $b$. A bend in the rods $c\ d$, as well as the position of the sockets $g$, raises it above the other part. This gives a space for the reins to pass through.

The two parts $a$ and $b$ are to be covered with cloth, rubber, or any proper material.

This contrivance is for a single horse.

It is a well-known fact that the two horses of a span often travel at different distances from the pole—one nearer than the other.

In my former patent, Fig. 3 shows a device to protect a span of horses from heat, &c. Fig. 2 shows an improvement upon that invention, which consists in having the arms $h$ so arranged as to slide through the socket $i$. These arms support the covering. If an animal stands off from the pole the arms can be slid out, so as to carry the covering over him. Both arms are secured by the set-screw $j$.

The standard K slides through the socket $l$, to regulate the elevation of the frames and covering. A set-screw, $m$, holds it at the elevation described.

What I claim as my invention, and desire to secure by Letters Patent, is—

The frames $a$ and $b$, having arms $c\ d$, frame $e$, socket $g$, the part $a$ being placed higher than $b$, as herein set forth, the whole operating as herein described.

In testimony that I claim the foregoing as my own I affix my signature in presence of two witnesses.

W. S. MARSH.

Witnesses:
 JOSEPH CROSS,
 MARY P. CROSS.